(12) United States Patent
Raab

(10) Patent No.: US 9,719,273 B2
(45) Date of Patent: Aug. 1, 2017

(54) FENCE VEGETATION BARRIER

(71) Applicant: Brian Raab, St. Gregor (CA)

(72) Inventor: Brian Raab, St. Gregor (CA)

(*) Notice: Subject to any disclaimer, the term of this patent is extended or adjusted under 35 U.S.C. 154(b) by 335 days.

(21) Appl. No.: 14/196,279

(22) Filed: Mar. 4, 2014

(65) Prior Publication Data

US 2015/0021531 A1 Jan. 22, 2015

Related U.S. Application Data

(60) Provisional application No. 61/777,721, filed on Mar. 12, 2013.

(51) Int. Cl.
| | |
|---|---|
| *E04H 17/00* | (2006.01) |
| *E04H 17/06* | (2006.01) |
| *A01G 1/08* | (2006.01) |
| *E01F 15/04* | (2006.01) |

(52) U.S. Cl.
CPC ............ *E04H 17/063* (2013.01); *A01G 1/08* (2013.01); *E01F 15/0469* (2013.01)

(58) Field of Classification Search
CPC .... E04H 17/063; A01G 1/08; A01G 13/0281; E01F 15/0469
See application file for complete search history.

(56) References Cited

U.S. PATENT DOCUMENTS

| | | | |
|---|---|---|---|
| 2,826,393 A | 3/1958 | Miller | |
| 3,384,351 A | 5/1968 | Turner, Jr. | |
| 3,515,373 A | 6/1970 | Abbe | |
| 3,704,004 A | 11/1972 | Carter, Jr. | |
| 3,713,624 A * | 1/1973 | Niemann | E04H 17/063 256/1 |
| 3,806,096 A | 4/1974 | Eccleston et al. | |
| 3,822,864 A | 7/1974 | Keys | |
| 3,991,980 A | 11/1976 | Blackburn | |
| 4,349,989 A | 9/1982 | Snider, Jr. | |
| 4,381,622 A * | 5/1983 | Spidell | A01G 1/08 411/455 |
| 4,478,391 A | 10/1984 | Kovach | |

(Continued)

FOREIGN PATENT DOCUMENTS

WO 2004003319 1/2004

*Primary Examiner* — Jonathan Masinick
*Assistant Examiner* — Matthew R McMahon
(74) *Attorney, Agent, or Firm* — Ryan W. Dupuis; Kyle R. Satterthwaite; Ade & Company Inc.

(57) ABSTRACT

A vegetation barrier for use beneath a fence to inhibit the growth of vegetation beneath said fence includes two vegetation barrier members and an intermediate member. Each vegetation barrier member is joinable to a fence post at one end and engages an intermediate member at the opposite end through longitudinally slidable engagement, allowing the vegetation barrier to readily accommodate uneven spacing between fence posts and further allowing the vegetation barrier to expand and contract. The vegetation barrier member and/or the intermediate member may further comprise elongated openings that allow the vegetation barrier to be secured to an underlying surface by a securement member that passes through the elongated opening and into the underlying surface, while still allowing for expansion and contraction of the vegetation barrier. Further provided are methods of covering a surface beneath a fence using said vegetation barrier.

17 Claims, 13 Drawing Sheets

(56) References Cited

U.S. PATENT DOCUMENTS

| | | |
|---|---|---|
| 4,497,472 A | 2/1985 | Johnson |
| 4,548,388 A | 10/1985 | Cobler |
| 4,595,175 A | 6/1986 | Kauffman et al. |
| 4,690,382 A | 9/1987 | Koperdak |
| 4,831,776 A * | 5/1989 | Fritch ................ A01G 1/08 404/102 |
| RE33,037 E * | 8/1989 | Kauffman ............ A01G 1/08 256/1 |
| 4,903,947 A | 2/1990 | Groves |
| 4,964,619 A * | 10/1990 | Glidden, Jr. ........ E04H 17/063 256/32 |
| 5,035,079 A * | 7/1991 | Groves ................ A01G 1/08 256/1 |
| 5,039,065 A | 8/1991 | Denton |
| 5,178,369 A | 1/1993 | Syx |
| D342,874 S | 1/1994 | Groves |
| D343,774 S | 2/1994 | Cox et al. |
| 5,285,594 A * | 2/1994 | Penny ............... E01F 15/0469 256/32 |
| 5,323,557 A * | 6/1994 | Sonntag ............ E01F 15/0469 47/32 |
| 5,328,156 A * | 7/1994 | Hoke .................. E04H 17/02 256/1 |
| 5,452,541 A | 9/1995 | DeMaio |
| 5,586,753 A | 12/1996 | Michiaels |
| 5,660,374 A | 8/1997 | Dayberry |
| 5,762,323 A | 6/1998 | Boswell et al. |
| 6,505,819 B1 | 1/2003 | Damon et al. |
| 6,837,487 B1 | 1/2005 | Oden et al. |
| D558,903 S | 1/2008 | Purvis |
| 8,215,056 B2 * | 7/2012 | Frederick .......... A01G 13/0268 47/31.1 |
| 8,272,624 B1 | 9/2012 | Frazier |
| 2004/0000665 A1 * | 1/2004 | Himmelreich ....... E04H 17/063 256/1 |
| 2005/0279981 A1 | 12/2005 | Onbey |

\* cited by examiner

FENCE VEGETATION BARRIER

This application claims the benefit under 35 U.S.C. 119(e) of U.S. provisional application Ser. No. 61/777,721, filed Mar. 12, 2013.

FIELD OF THE INVENTION

This disclosure relates to the field of vegetation barriers to prevent weeds and other types of vegetation from growing under and/or along the base of a fence.

BACKGROUND

Commercial and residential property owners and managers often erect fences to define property boundaries, obtain privacy, and restrict movement of people and animals onto and off of the property. The most common types of fences are chain link fences and wooden board fences. Both fence types typically include fence posts that are secured into the ground at regularly spaced intervals, with the fence built between posts and above ground.

Trimming grass, weeds, and other vegetation along the base of a fence can be difficult and time consuming, since lawnmowers cannot access vegetation that grows underneath or immediately adjacent to a fence. This requires additional maintenance of vegetation near and/or under the fence to maintain a tidy appearance and encourages the use of herbicides and/or power tools such as weed trimmers, both of which have undesirable environmental effects. Further, for chain link or other open fences, grass and weeds can grow up through the fence material, making the vegetation particularly difficult to remove.

Another problem facing property owners is that there are limitations to how close to the ground a fence can be placed, particularly when the ground is not perfectly level. When the ground is uneven, gaps beneath the fence can allow animals and pets to pass under the fence, leading to undesired access or egress.

One solution to these problems is to install a vegetation barrier under the fence, which may also act as a barrier to cover any gaps between the bottom of the fence and the ground surface. There are a number of patents and products that provide a barrier to vegetation along a fence bottom. For examples see: US20050279981, U.S. Pat. No. 2,826,393, U.S. Pat. No. 3,384,351, U.S. Pat. No. 3,515,373, U.S. Pat. No. 3,704,004, U.S. Pat. No. 3,806,096, U.S. Pat. No. 3,822,864, U.S. Pat. No. 3,945,747, U.S. Pat. No. 3,991,980, U.S. Pat. No. 4,349,989, U.S. Pat. No. 4,478,391, U.S. Pat. No. 4,497,472, U.S. Pat. No. 4,548,388, U.S. Pat. No. 4,595,175, U.S. Pat. No. 4,690,382, U.S. Pat. No. 4,903,947, U.S. Pat. No. 5,039,065, U.S. Pat. No. 5,178,369, U.S. Pat. No. 5,452,541, U.S. Pat. No. 5,586,753, U.S. Pat. No. 5,660,374, U.S. Pat. No. 5,762,323, U.S. Pat. No. 6,505,819, U.S. Pat. No. 6,837,487, U.S. Pat. No. 8,272,624, U.S. Pat. No. D342,874, U.S. Pat. No. D343,774, U.S. Pat. No. D558,903, WO2004003319, MOWSTRIP® fence underlay marketed by Mowstrip in Fargo, N. Dak. available at www.mowstrip.com, and WEEDSEAL® fence and border guard marketed by Bruckman Rubber Co. in Hastings, Nebr., available at www.weedseal.com.

While each of these products serves a purpose, there remains a desire for an under-fence vegetation barrier that is economical, effective, easy to install, flexibly adaptable to different fence types and layouts, and that allows for expansion and contraction during freeze-thaw cycles.

SUMMARY OF THE INVENTION

According to one aspect of the invention there is provided a vegetation barrier for deterring the growth of vegetation beneath a fence having a pair of spaced-apart posts and a lower edge extending between said posts, said vegetation barrier comprising two vegetation barrier members and an intermediate member. Further provided are methods of installing a vegetation barrier beneath a fence.

An embodiment is a vegetation barrier for deterring the growth of vegetation beneath a fence having a pair of spaced-apart posts and a lower edge extending between said posts, said vegetation barrier comprising:

(a) first and second vegetation barrier members, each of said vegetation barrier members having a length extending longitudinally between opposite first and second ends and having opposite side edges extending in the longitudinal direction, each of said vegetation barrier members having a width between said opposite side edges in the lateral direction and further comprising an upper surface and a lower surface; each of said vegetation barrier members additionally comprising a fence post opening proximal to said first end and further comprising a slot extending between the perimeter of the fence intermediate member and the fence post opening; and (b) an intermediate member having a length extending longitudinally between opposite first and second ends and having opposite side edges extending in the longitudinal direction, said intermediate member having a width between said opposite side edges in the lateral direction and further comprising an upper surface and a lower surface, wherein a portion of the second end of each of the first and second vegetation barrier members is arranged to engage, through relative sliding in the longitudinal direction, an end portion of the intermediate member.

In an embodiment, the second end portion of the first vegetation barrier member comprises a retaining member that extends beneath the lower surface of said first vegetation barrier member to form a channel, said channel arranged to receive an end of the intermediate member.

In an embodiment, the second end portion of the second vegetation barrier member comprises a retaining member that extends beneath the lower surface of said second vegetation barrier member to form a channel, said channel arranged to receive an end of the intermediate member.

In an embodiment, the intermediate member comprises a retaining member that extends along at least a substantial portion of the full length of the intermediate member, said channel arranged to receive an end of the first and/or second vegetation barrier member.

In an embodiment, the vegetation barrier further comprises a securement strip for securing the vegetation barrier to an underlying surface; said securement strip comprising a base, said base having with a length, a width and opposite first and second ends spaced apart in the longitudinal direction, and said securement strip further comprising first and second vegetation barrier retaining members spaced apart in the longitudinal direction and positioned proximal to a respective end portion of said securement strip, wherein the retaining members are arranged to receive, through relative sliding in the longitudinal direction, an end of the first or second vegetation barrier member or an end of the intermediate member.

In an embodiment, at least one of the first and second end portion of the securement strip comprises an aperture, said aperture arranged to allow the securement strip to be secured to the underlying surface by a fastener, said fastener arranged to pass through the aperture and into the underlying surface. In a further embodiment, the aperture is an elongated aperture.

In an embodiment, at least one of the first vegetation barrier member, the second vegetation barrier member, and the intermediate member comprises a securement tab extending laterally outward from a side edge of said member; said securement tab comprising an aperture arranged to allow the securement strip to be secured to the underlying surface by a fastener, said fastener arranged to pass through the aperture and into the underlying surface. In a further embodiment, the aperture is an elongated aperture.

In an embodiment, at least one of the first vegetation barrier member, the second vegetation barrier member, and the intermediate member comprises an aperture formed within said member; said aperture arranged to allow said member to be secured to an underlying surface by a fastener, said fastener arranged to pass through the aperture and into the underlying surface. In a further embodiment, the aperture is an elongated aperture.

In an embodiment, the upper surface of each of the first vegetation barrier member, the second vegetation barrier member, and the intermediate member forms an apex between the opposing side edges, said apex being higher in elevation than both side edges.

In an embodiment, the second end of each of the first and second vegetation barrier members is devoid of any fence post opening.

In an embodiment, the first end of the first and/or second vegetation barrier member is rounded.

In an embodiment, at least one of the first vegetation barrier member, second vegetation barrier member, and intermediate member comprises an upward riser positioned laterally between the opposing side edges of said member and extending substantially perpendicular to the upper surface of said member, said riser extending longitudinally along at least a substantial portion of the length of said member.

In a further embodiment, the upward riser comprises a preformed slot extending longitudinally proximal to and in communication with an end of said member, said preformed slot positioned at the base of the upward riser adjacent to the upper surface of said member.

In an embodiment, the slot within each vegetation barrier member extends between the outer edge of the first end of the vegetation barrier member and the fence post opening.

In an embodiment, the vegetation barrier comprises at least two intermediate members.

In an additional embodiment, the vegetation barrier further comprises a filler member for covering a gap between a fence post opening and a fence post, said filler member comprising an upper surface, a lower surface, and side edges; a fence post opening; and a slot extending from the perimeter of the filler member to the fence post opening of the filler member.

Another embodiment is a method of covering a surface beneath a fence that is mounted on a plurality of fence posts in order to inhibit vegetation from growing beneath said fence, said method comprising:

placing a first vegetation barrier member under the fence and positioning a first fence post within the fence post opening at the first end of the first vegetation barrier;

placing a second vegetation barrier member under the fence and positioning a second fence post within the fence post opening at the first end of the second vegetation barrier; and joining the first and second vegetation barrier members using at least one intermediate member.

In an embodiment of the method, the step of joining the first and second vegetation barrier members comprises:

joining the first vegetation barrier member to an intermediate member by mating the second end of the first vegetation barrier member to a first end of the intermediate member by relative sliding in the longitudinal direction;

joining the second vegetation barrier member to the second end of the intermediate member by mating the second end of the second vegetation barrier member to a second end of the intermediate member by relative sliding in the longitudinal direction.

In another embodiment of the method, the step of joining the first and second vegetation barrier members comprises:

joining the first vegetation barrier member to a first intermediate member by mating the second end of the first vegetation barrier member to a first end of the first intermediate member by relative sliding in the longitudinal direction;

joining the second vegetation barrier member to a second intermediate member by mating the second end of the second vegetation barrier member to a first end of the second intermediate member by relative sliding in the longitudinal direction; and joining the second ends of the first and second intermediate members by:

(a) mating the second end of the first intermediate member to a first end of a third intermediate member and mating the second end of the second intermediate member to a second end of the third intermediate member, said mating accomplished by relative sliding in the longitudinal direction, or (b) mating the second end of the first intermediate member to a first terminal end of a series of mated intermediate members and mating the second end of the second intermediate member to a second terminal end of a series of mated intermediate members by relative sliding in the longitudinal direction, said series of mated intermediate members comprising a plurality of intermediate members mated to one another by relative sliding in the longitudinal direction.

In an embodiment, the method further comprises cutting the vegetation barrier member around the fence post opening to produce a differently sized and/or shaped fence post opening that can encompass a fence post that is larger and/or of a different shape than the initial fence post opening.

In an additional embodiment, the method further comprises a step of forming an intermediate member by cutting a vegetation barrier member laterally to remove the first end portion of the vegetation barrier member comprising the fence post opening.

In another embodiment, the method further comprises a step of reducing the length of at least one of the first and second vegetation barrier members by cutting said at least one of the first and second vegetation barrier members laterally to remove a portion of said vegetation barrier member from the second end of said vegetation barrier member.

In an embodiment, the method further comprises a step of positioning a filler member around at least one fence post.

In an embodiment, the method further comprises a step of applying a sealant to fill a gap between the vegetation barrier and a fence post.

In an embodiment, the method further comprises a step of securing the vegetation barrier to an underlying surface by passing a securement member through an aperture in the vegetation barrier and into the underlying surface.

In an embodiment, the method further comprises a step of sealing a gap between the securement member and the aperture by applying a sealant.

Yet another embodiment is a vegetation barrier for deterring the growth of vegetation beneath a fence having a pair of spaced-apart posts and a lower edge extending between said posts, said vegetation barrier comprising:

(a) first and second vegetation barrier members, each of said vegetation barrier members having a length extending longitudinally between opposite first and second ends and having opposite side edges extending in the longitudinal direction, each of said vegetation barrier members having a width between said opposite side edges in the lateral direction and further comprising an upper surface and a lower surface; and (b) an intermediate member having a length extending longitudinally between opposite first and second ends and having opposite side edges extending in the longitudinal direction, said intermediate member having a width between said opposite side edges in the lateral direction and further comprising an upper surface and a lower surface, wherein a portion of the second end of each of the first and second vegetation barrier members is arranged to engage, through relative sliding in the longitudinal direction, an end portion of the intermediate member.

Various embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
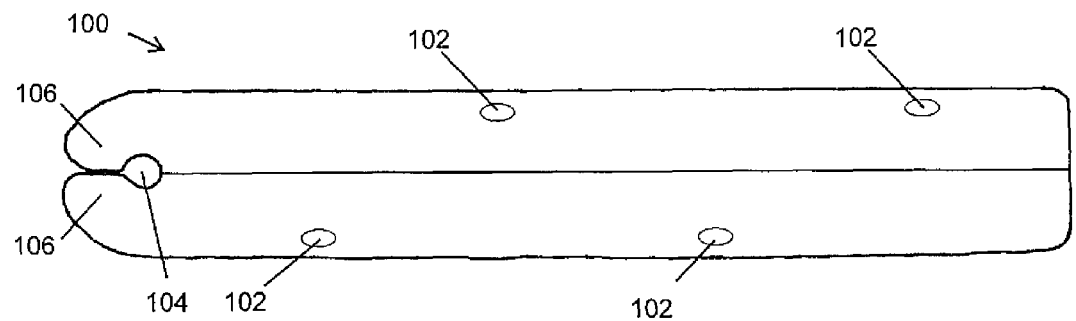
FIG. 1 depicts a top plan view of a vegetation barrier member.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense. Further, where considered appropriate, reference numerals may be repeated among the figures to indicate corresponding or analogous elements.

Provided generally is a vegetation barrier that connects to the posts of a fence. Generally in all embodiments there is provided a first vegetation barrier member, a second vegetation barrier member and an intermediate member coupled between the first and second vegetation barrier members for relative sliding in a longitudinal direction. A first end of each of the first and second vegetation barrier members connects to a fence post and the second ends of the first and second vegetation barrier members are joined by one or more intermediate members. The vegetation barrier member and/or intermediate member may comprise elongated apertures that allow the vegetation barrier member and/or intermediate member to be fastened to an underlying surface while allowing for expansion and contraction of the assembled vegetation barrier during freeze-thaw cycles.

A first embodiment of a vegetation barrier member is depicted in FIG. 1. The vegetation barrier member 100 extends in a longitudinal direction between the first and second opposing ends. The vegetation barrier member 100 further comprises opposing side edges that extend in the longitudinal direction. The distance between the opposing side edges in the lateral direction defines the width of vegetation barrier member 100. The vegetation barrier member 100 is elongated, having a length in the longitudinal direction greater than its width in the lateral direction, and comprises a first end with a fence post opening 104 and fence post engaging arms 106 and a second end opposite the first end that is devoid of a fence post opening.

The fence post opening 104 is proximal to the first end of the vegetation barrier member 100 and is in a generally central position within the vegetation barrier member 100 in the lateral direction. In an embodiment, the first end of the vegetation barrier member 100 is rounded such that when two vegetation barrier members 100 are joined to a single fencepost, the overlapping vegetation barrier members 100 maintain an even rounded edge, irrespective of the relative angle of the two overlapping vegetation barrier members 100. The radius of curvature of the rounded edge is centered on fence post opening 104, with a radius that is roughly half the width of the vegetation barrier member in the lateral direction. Accordingly, as shown in the Figures, the perimeter edge at the first end of each vegetation barrier member that is semi-circular in shape about the respective fence post opening is continuous with both of the opposite side edges. Accordingly, as further shown in more particularly in FIG. 11; when the first end of each vegetation barrier member is overlapped by the first end of an adjacent one of the vegetation barriers about a common one of the fence posts and the slot joins the semi-circular perimeter edge at a laterally central location, a continuous edge is formed along one side of the fence between the side edges of the adjacent vegetation barriers by the perimeter edges of the vegetation barrier members irrespective of a relative angle between the two adjacent vegetation barriers about an upright axis of said common one of the fence posts. In an embodiment, the fence post engaging arms 106 have rounded ends, substantially as shown in FIG. 1, that allow the fence post engaging arms 106 to be easily positioned around a fence post by twisting the fence post engaging arms 106 relative to one another and sliding them around the fence post; resulting in the fence post being encompassed within fence post opening 104. In other embodiments, the fence post engaging arms 106 may have square or angled edges.

The arrangement of the fence post engaging arms 106 allows for easy installation of a vegetation barrier member 100 on a new or existing fence post. The vegetation barrier member 100 is similarly easy to remove from a fence post, making it straightforward to reuse and/or reposition a vegetation barrier member 100.

Vegetation barrier member 100 further comprises elongated apertures 102, elongated in the longitudinal direction, that can be used to secure vegetation barrier member 100 to the ground or other surface underlying the fence with which vegetation barrier member 100 is engaged. In an embodiment, the vegetation barrier member 100 comprises at least one aperture 102 proximal to each opposing side edge. In an embodiment, the aperture 102 is elongated in the longitudinal direction. In a further embodiment, the vegetation barrier member 100 comprises a plurality of apertures distributed along the length of the vegetation barrier member 100 in the longitudinal direction, proximal to each opposing side edge. Securement of the vegetation barrier member 100 to the ground or other surface underlying the fence can be achieved through the insertion of a securement member, such as a securement pin or ground screw, through aperture 102 and into the ground or other underlying surface. The length of aperture 102 in the longitudinal direction should be sufficient, relative to the diameter of the securement pin or ground screw, to allow for expansion and contraction of the vegetation barrier member 100 without interference from the securement pin or ground screw, such that vegetation barrier member 100 remains securely anchored and does not bow or buckle when exposed to freeze-thaw conditions. In order to allow for expansion and contraction of the vegetation barrier member 100 it is preferable that the securement member not be secured tightly against the surface of the vegetation barrier member 100.

In the embodiment depicted in FIG. 1, vegetation barrier member 100 forms an apex between the opposing side edges, said apex higher in elevation relative to both side edges, with the body of vegetation barrier member 100 steadily sloped from the apex towards the opposing side edges. In an embodiment, the apex is generally central in the lateral direction and extends substantially along the full length of vegetation barrier member 100 extending from the second end to the proximal edge of the fence post opening 104. This configuration enables water to run off the surface of the vegetation barrier member 100 and further impedes soil build-up on the surface of vegetation barrier member 100. Soil build-up is undesirable as it could promote the growth of vegetation on top of the vegetation barrier. In other embodiments, vegetation barrier member 100 may have a substantially flat profile.

Figure 2:
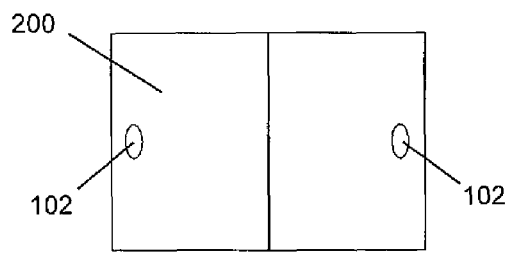
FIG. 2 depicts a top plan view of an intermediate member.
Figure 3:
FIG. 3 depicts an elevation view of an intermediate member.
Figure 4:
FIG. 4 depicts an elevation view of a vegetation barrier member mated with an intermediate member.

FIGS. 2 and 3 depict an embodiment of an intermediate member 200. Intermediate member 200 extends in a longitudinal direction between first and second opposite ends. Intermediate member 200 further comprises opposite side edges that extend in the longitudinal direction and a width between the opposite edges in the lateral direction. The width of the intermediate member 200 is sufficiently wide, relative to the width of the vegetation barrier member 100, to allow vegetation barrier 100 to be inserted into intermediate member 200 as depicted in FIG. 4. Intermediate member 200 further comprises one or more apertures 102 that can be used to secure intermediate member 200 to the ground or other surface underlying the fence. In an embodiment, intermediate member 200 comprises two apertures 102, each aperture 102 positioned proximal to one of the opposing side edges and positioned substantially central in the longitudinal direction. Each opposite side edge of intermediate member 200 has an outer edge comprising a retaining extension 300 that extends beneath the bottom of intermediate member 200 to form a channel that extends along at least a substantial portion of the full length of each opposite edge of the intermediate member 200 in the longitudinal direction. In an embodiment, one or both channels extends along the full length of the intermediate member 200 in the longitudinal direction. The channels defined by each retaining extension 300 are arranged to receive an end of a vegetation barrier member 100, as illustrated in FIG. 4, and retain the vegetation barrier member 100 such that movement of the vegetation barrier member 100 relative to the intermediate member 200 is substantially limited to sliding in the longitudinal direction.

The retaining extensions 300 of intermediate member 200 enable the vegetation barrier member 100 to be inserted into intermediate member 200 in the longitudinal direction, as depicted in FIG. 4. In an embodiment, the vegetation barrier member 100 is inserted into intermediate member 200 by sliding. In the embodiment depicted in FIG. 1, the second end of vegetation barrier member 100, the end devoid of a fence post opening, has rounded edges to facilitate sliding the second end of the vegetation barrier member 100 into intermediate member 200. In further embodiments, the edges of the second end of vegetation barrier member 100 may be angled or square.

Vegetation barrier member 100 and intermediate member 200 should each be made of a material that blocks the growth of vegetation. It is preferable that the material be weather-resistant, durable, and sufficiently flexible to allow the vegetation barrier 900 to follow the contours of a ground surface beneath a fence. In an embodiment, the material is sufficiently thin and pliable to allow a user to cut the material using a cutting instrument such as a blade, scissors, shears, or a punch. In an embodiment, the punch is a punch with interchangeable bits that are configured to correspond to common fence post sizes and shapes. Examples of suitable materials for the barrier member 100 and intermediate member 200 include, but are not limited to, for example high density polyethylene, plastic, rubber, and composite materials. In an embodiment, the material further comprises a UV inhibitor. In an embodiment, the material is non-porous or of low porosity, minimizing the absorption of chemicals and other environmental contaminants.

Figure 5:
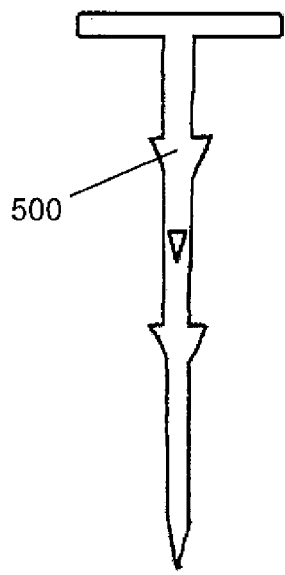
FIG. 5 depicts an elevation view of a securement pin.

FIGS. 5 and 6-8 depict two different embodiments of securement members that could be used to secure a vegetation barrier member 100 and/or intermediate member 200 to the ground or surface underlying a fence. FIG. 5 depicts a barbed securement pin 500. The securement pin 500 comprises an elongated barbed shaft and a substantially planar head joined to one end of the barbed shaft in an orientation that is perpendicular to said shaft. The end of the barbed shaft opposite the head is pointed to permit penetration into a surface. The diameter of the barbed shaft of securement pin 500 should be sufficiently narrow to fit through apertures 102 and the head of securement pin 500 should be sufficiently broad to fully cover aperture 102, thereby inhibiting vegetation from growing through aperture 102, when secured by securement pin 500. Securement pin 500 may be made of any suitable material as will be understood to one skilled in the art.

Examples of suitable materials include plastic and metal, wherein the metal is preferably galvanized or otherwise resistant to rust. These securement members are merely illustrative and any suitable fastener, as will be readily understood to one skilled in the art, could be employed to secure the vegetation barrier 900 to an underlying surface.

Figure 6:
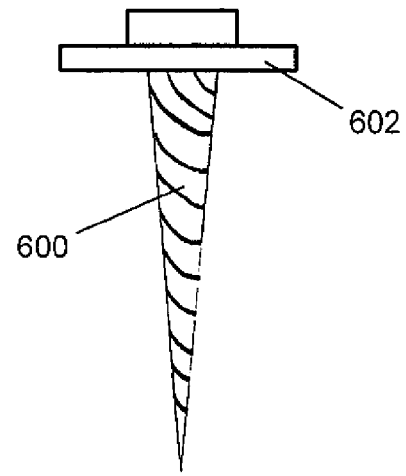
FIG. 6 depicts an elevation view of a ground screw together with a washer.
Figure 7:
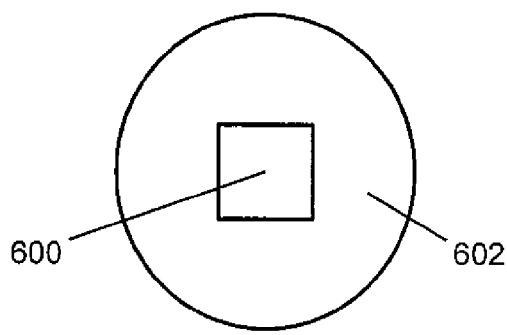
FIG. 7 depicts a top plan view of the combination shown in FIG. 6.
Figure 8:
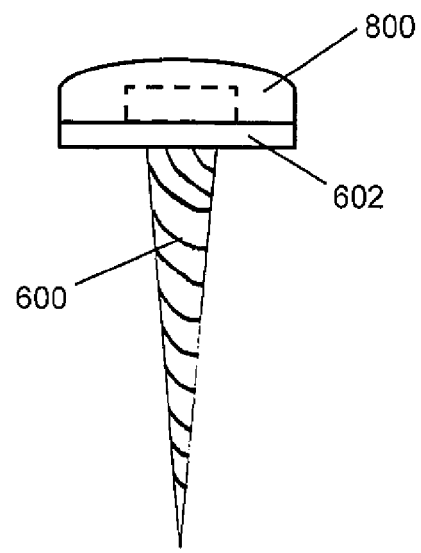
FIG. 8 depicts an elevation view of the combination shown in FIG. 6 together with a cap.

FIGS. 6 and 7 depict a threaded fastener 600 together with a washer 602. The fastener 600 comprises an elongated conical threaded shaft and a drive head joined to the threaded shaft. The drive head of threaded fastener 600 is depicted as square, but the head could be of any design that allows the threaded fastener to be driven into the ground. For example, the head could be hexagonal or the head could be designed to accept a drive member such as a screw bit or hex wrench. In an embodiment, the head is designed to be driven by a drill to enable rapid installation of threaded fastener 600. The washer 602 should be sufficiently wide to fully cover aperture 102, thereby inhibiting vegetation from growing through aperture 102 when secured by threaded fastener 600 together with washer 602. In an embodiment, threaded fastener 600 may be used with a cap 800 that connects to the drive head. The cap 800 may be made of a water resistant material that protects the drive head of fastener 600 from the elements. Suitable materials for cap 800 include but are not limited to plastic and metal. Cap 800 may further serve to hide the drive head of fastener 600 from view, improving the aesthetics of the installed and secured vegetation barrier 900.

Figure 9:
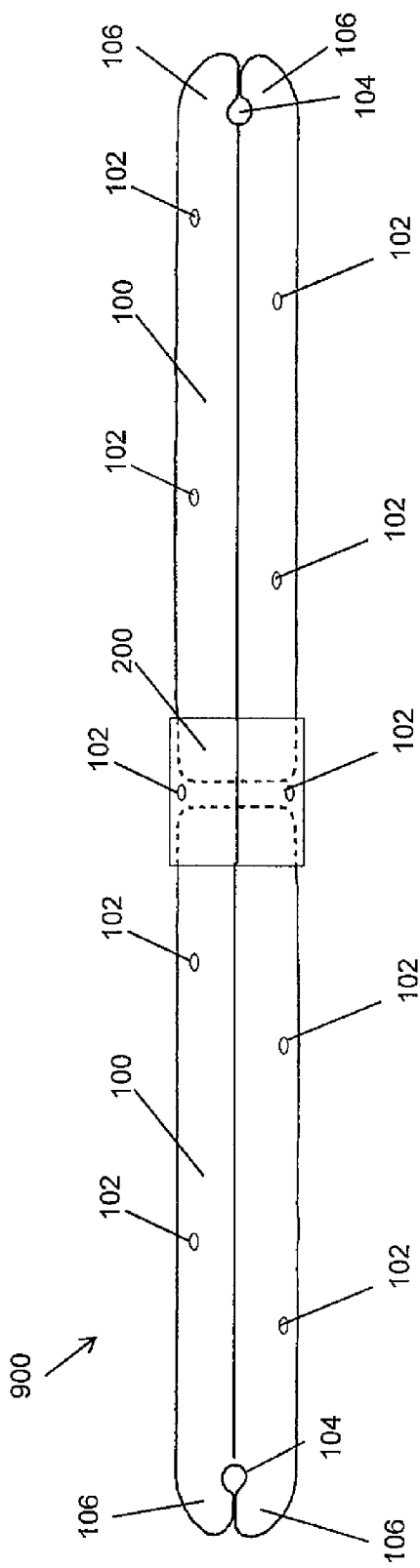
FIG. 9 depicts a top plan view of two vegetation barrier members mated to an intermediate member.
Figure 13:
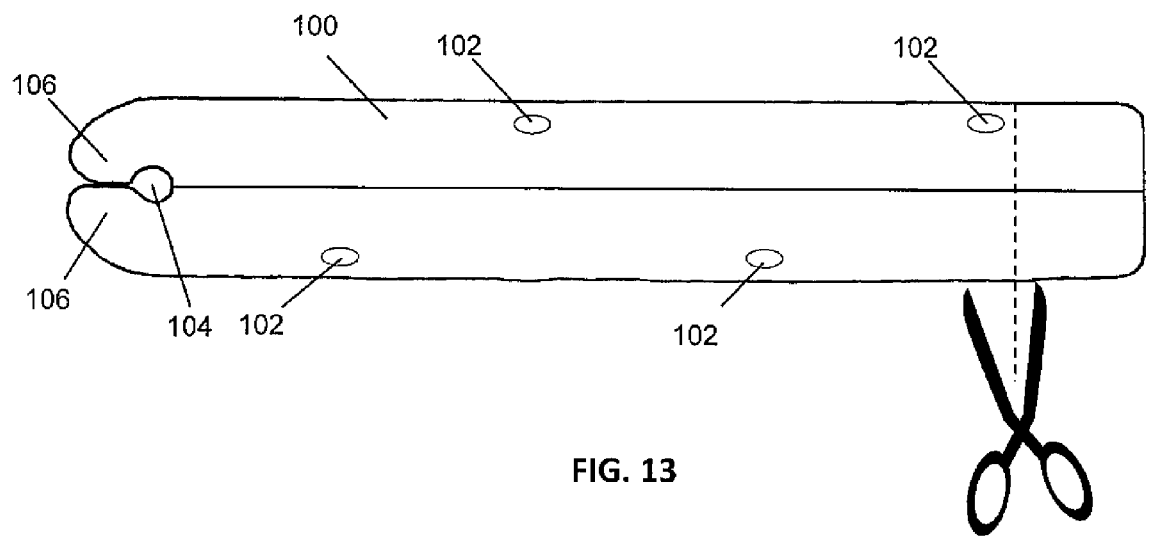
FIG. 13 depicts a top plan view of a vegetation barrier member, with scissors and a dashed line indicating how the vegetation barrier member may be cut a desired length.
Figure 14:
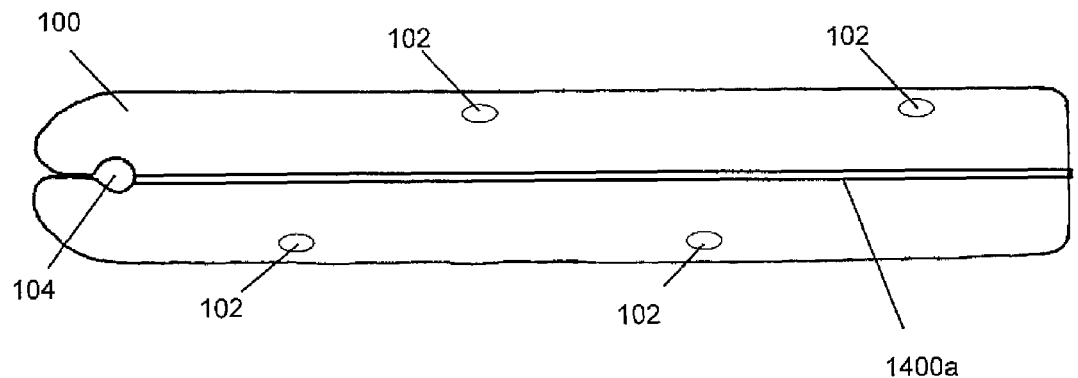
FIG. 14 depicts a top plan view of a second embodiment of a vegetation barrier member.
Figure 15:
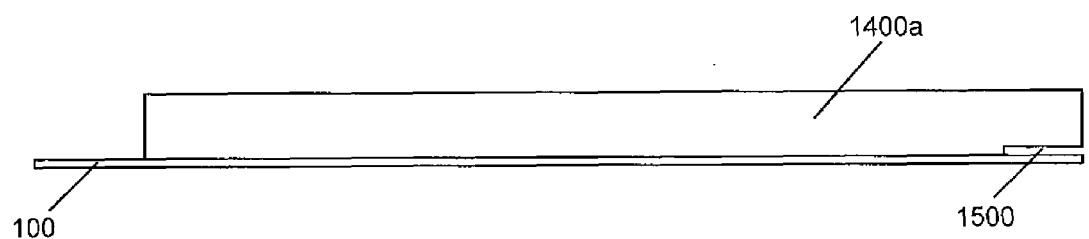
FIG. 15 depicts a side elevation view of the vegetation barrier member of FIG. 14.
Figure 16:
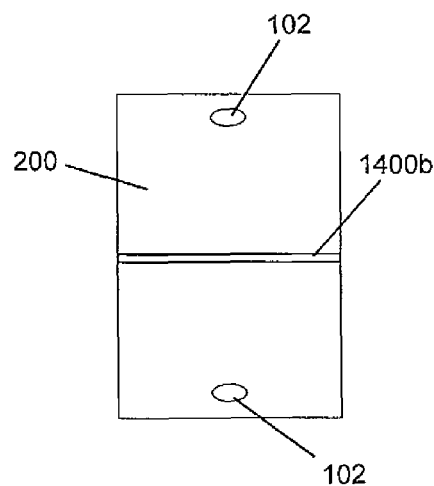
FIG. 16 depicts a top plan view of a second embodiment of an intermediate member.
Figure 17:
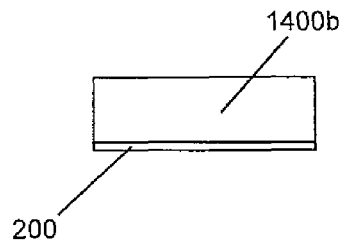
FIG. 17 depicts a side elevation view of the intermediate member of FIG. 16.
Figure 18:
FIG. 18 depicts a side elevation view of a third embodiment of a vegetation barrier member.

FIG. 9 depicts an embodiment of an assembled vegetation barrier 900. Two vegetation barrier members 100 are joined through longitudinal sliding engagement with intermediate member 200. In an embodiment, the length of the body of vegetation barrier member 100 in the longitudinal direction, measured from the second end of the vegetation barrier member 100 to the proximal edge of fence post aperture 104, corresponds to roughly half the standard distance between fence posts. The length of intermediate member 200 allows for some variability in fence post spacing, since the gap between the joined vegetation barrier members 100 may nearly equal the length of intermediate member 200. The overlap between the intermediate member 200 and each vegetation barrier member 100 should be sufficient to prevent the end of said vegetation barrier member 100 from becoming readily disengaged from intermediate member 200, but there is no need for the ends of the two vegetation barrier members 100 to be in very close proximity with one another, since intermediate member 200 acts as a barrier to inhibit vegetation from growing in the gap between the two vegetation barrier members 100. In other embodiments, the vegetation barrier members 100 may be of varying lengths and vegetation barrier members 100 can be cut to size, for example as depicted in FIG. 13, if the combined length of the body of two vegetation barrier members 100 is longer than the span between fence posts. It is preferred that the vegetation barrier member 100 be cut to size by removing a portion of the second end of the vegetation barrier member 100 as depicted in FIG. 9. The length of the portion removed may be selected depending on the length of vegetation barrier 900 required to span the distance between two fence posts. When assembling vegetation barrier 900, it is preferred that a gap be included between the ends of adjacent vegetation barrier members 100, joined by intermediate member 200, in order to allow for longitudinal expansion and contraction of each vegetation barrier member 100 without buckling or bowing. The size of the gap may vary, but should be sufficient to allow for longitudinal expansion and contraction of the vegetation barrier members 100 without the ends of said members coming into contact. In another embodiment, opposing vegetation barrier members 100 may overlap.

Figure 10:
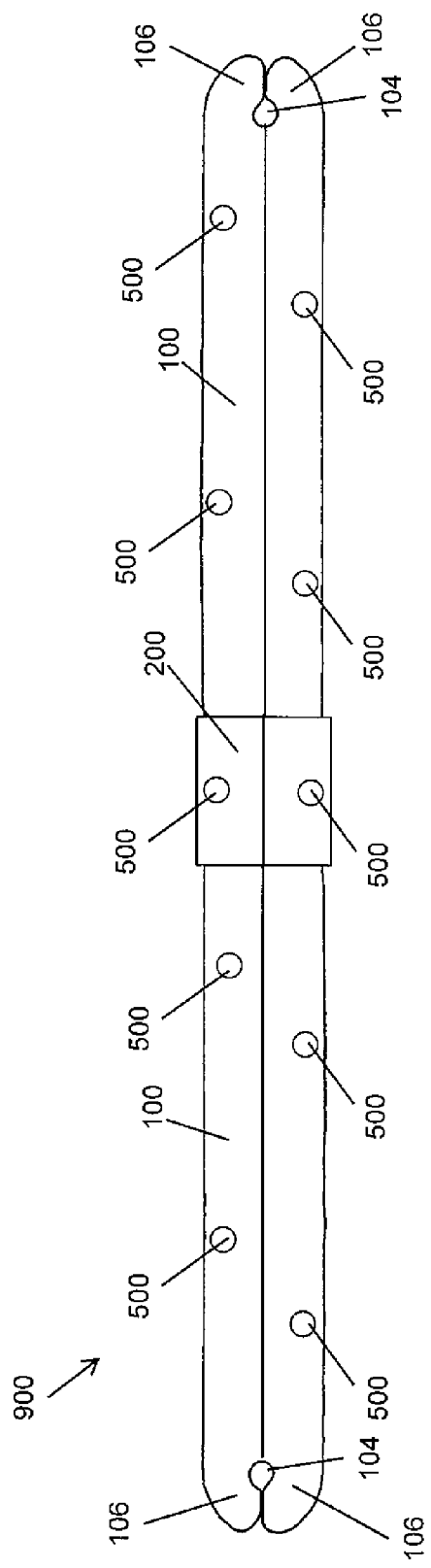
FIG. 10 depicts a top plan view of the combination shown in FIG. 9, secured to the underlying surface by securement pins.

FIG. 10 depicts the vegetation barrier 900 of FIG. 9 secured to the ground or underlying surface by securement pins 500. The securement pins 500 pass through the apertures 102 and into the underlying surface. The securement pins serve to prevent the vegetation barrier 900 from shifting position in the longitudinal or lateral direction and further prevent the vegetation barrier 900 from lifting away from the underlying surface in a vertical direction. The heads of securement pins 500 serve a dual purpose: first to secure the vegetation barrier 900 in position and to cover apertures 102 to prevent vegetation from growing through said apertures 102. Any type of securement pin 500, threaded fastener 600 and washer 602 combination, or other securement member as will be understood by one skilled in the art may be used to secure vegetation barrier 900 to the ground or underlying surface, so long as the securement member fully covers aperture 102, thereby inhibiting vegetation from growing through aperture 102. If any aperture 102 is not covered by a securement member, that aperture 102 may be covered by a plug or other cover (not shown) to inhibit vegetation growth through said aperture. Additionally, the gap between a pin 500 and corresponding aperture 102 may optionally be sealed using a flexible sealant such as silicone in order to prevent any possibility of vegetation growth through the aperture 102 around pin 500.

Figure 11:
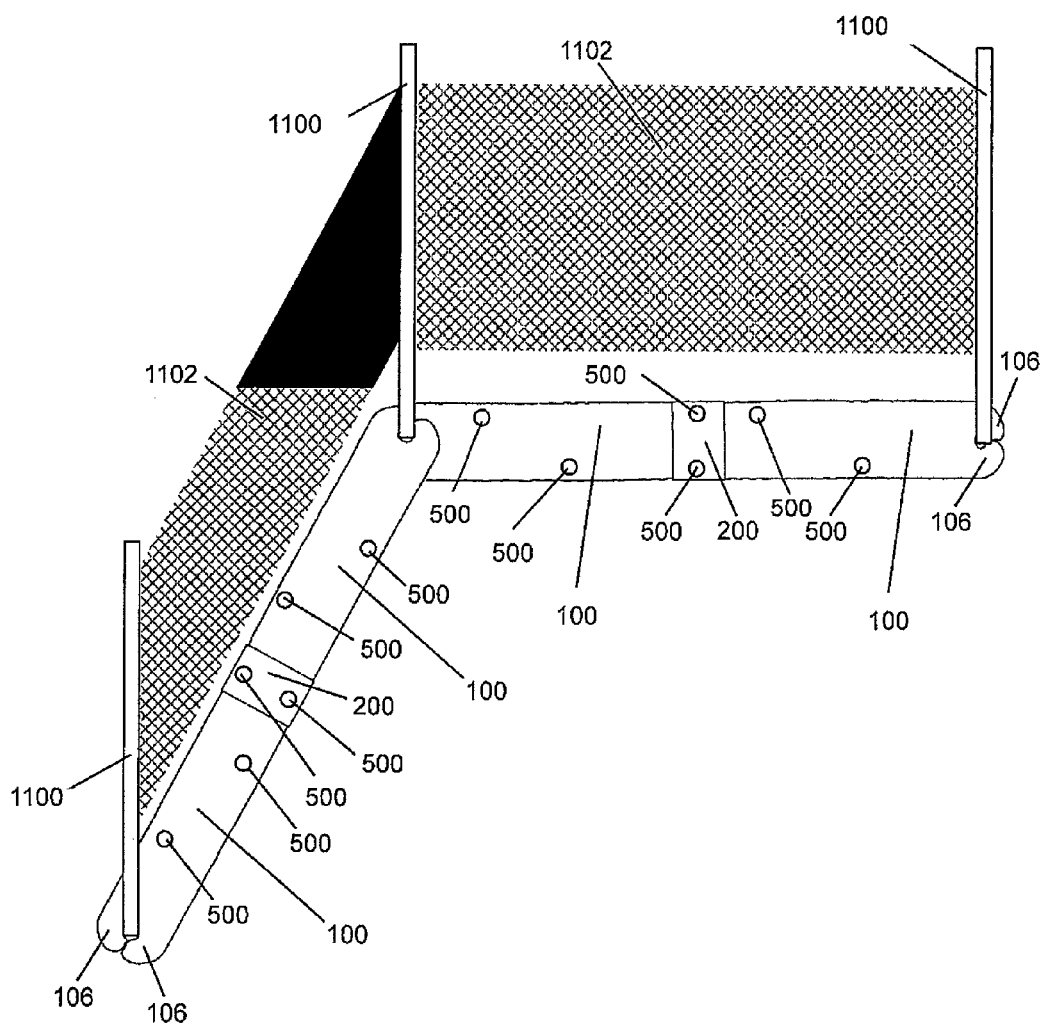
FIG. 11 depicts an orthogonal view of two assembled vegetation barriers, each vegetation barrier joined to two fence posts and spanning a section of fence.

FIG. 11 depicts two vegetation barriers 900 installed beneath a fence. Each vegetation barrier member 100 is fastened to a fence post 1100 by passing the fence post engaging arms 106 around the fence post 1100 to position the fence post 1100 within a fence post opening 104. When the first ends of two fence strips 100 are joined to a common fence post, as illustrated for the central fence post 1100 shown in FIG. 11, the first ends of the two vegetation barrier members 100 overlap, with central fence post passing through the fence post opening 104 of each overlapping vegetation barrier member 100. The first ends of overlapping vegetation barrier members 100 are in an overlapping relationship, but are not engaged in any fixed relationship and are independently free to rotate around the rotational axis formed by the central fence post. As such, the overlapping vegetation barrier members 100 can readily accommodate any angle between adjacent fence sections. There is no requirement for adjacent fence sections to be positioned at a 90 or 180 degree angle, or at any other predetermined angle.

Figure 12:
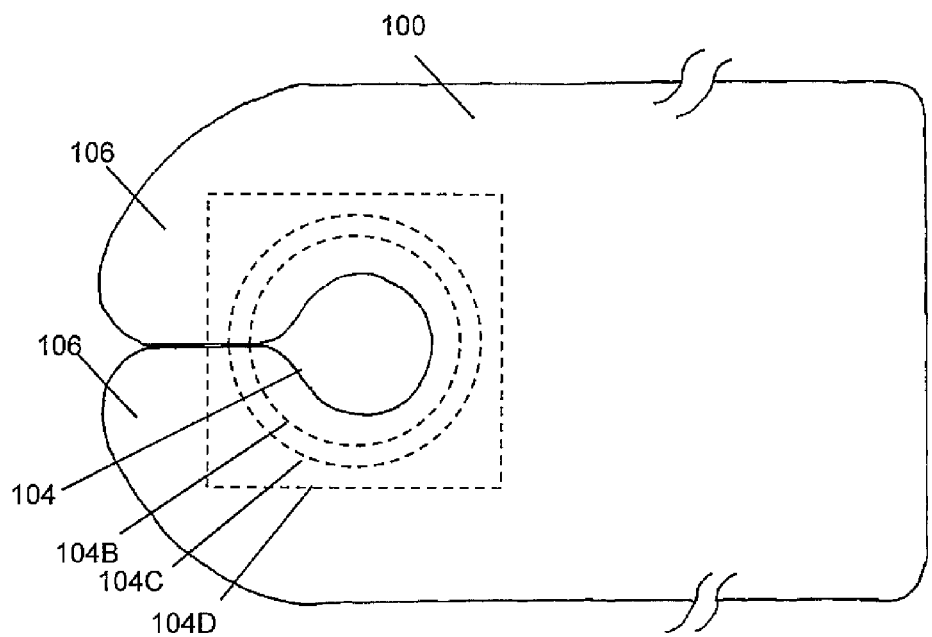
FIG. 12 depicts a top plan view of a vegetation barrier member, with dashed lines indicating where additional post holes could be formed to fit differently sized round or square fence posts.

While the illustrated embodiments depict the vegetation barrier 900 joined to a chain-link fence with round fence posts, the vegetation barrier 900 can be used with any style of fence that employs fence posts, including wooden board fences. The fence post opening 104 can also be adapted to fit any size and shape of fence post. For example, chain link fence posts commonly come in three standard sizes: line posts that are 2⅜ inches in diameter, terminal posts that are 2⅞ inches in diameter, and gate posts that are 3½ inches in diameter. Wooden fence posts are typically square with a nominal width and thickness of 4×4 inches, which generally corresponds to an actual width and thickness of 3.5×3.5 inches. In an embodiment, the vegetation barrier member 100 is manufactured with a round fence post opening with a diameter that slightly exceeds the diameter of the smallest fence post that is expected to be encountered. For example, if the vegetation barrier 900 is expected to be used with a chain link fence, then the diameter of the preformed opening would slightly exceed the diameter of a chain link fence line post. The fence post opening 104 can then be cut to a larger diameter (according to broken lines 104B or 104C) or to a square shape (according to broken line 104D), as shown in FIG. 12, in order to accommodate a larger round fence post or a larger square fence post. In an embodiment, a punch may be used to cut the fence post opening 104 to a desired size. In another embodiment, the fence post opening 104 may be cut to size using a manual or power tool; such as scissors, shears, punch, a safety blade, or a hole saw. It is preferred that the diameter or width of the fence post opening 104 be only slightly larger than the diameter or width of the fence post 1100 in order to minimize the gap between the fence post opening 104 and the periphery of fence post 1100. A large gap between fence post opening 104 and the periphery of fence post 1100 could allow vegetation to grow between the vegetation barrier member 100 and the fence post 1100. The preceding fence post dimensions are provided as examples only and it is to be understood that the fence post opening 104 could be of any diameter or width that would accommodate a fence post 1100. Further, the shape of the fence post opening 104 is not limited to round or square, but could be any shape that corresponds to the shape of a fence post. In an embodiment, the vegetation barrier member is devoid of any preformed fence post opening 104, allowing the fence post opening 104 to be custom cut by a user.

Figure 21:
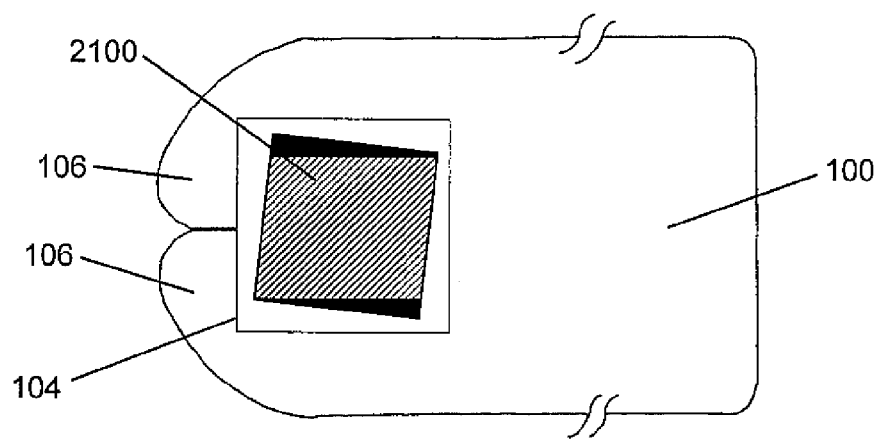
FIG. 21 depicts a top plan view of a vegetation barrier member, wherein the fence post opening of the vegetation barrier member is positioned around a fence post.

When the vegetation barrier 900 is installed on a fence with one or more fence posts that are of a non-round cross-section, the orientation of the posts may not be entirely consistent. For example, a fence made with square fence posts, a fence post may be installed at an angle relative to an adjacent fence post. When fence post opening 104 is only slight larger than the fence post, this could lead to adjacent vegetation barrier members 100 having second ends that are laterally misaligned, making it difficult to join said vegetation barrier members 100 with an intermediate member 200. This may be addressed by using a fence post opening 104 that is sufficiently large to allow the vegetation barrier member 100 to rotate about the fence post 2100, as depicted in FIG. 21. However, having a larger fence post opening 104 introduces a wider than usual gap between the fence post 2100 and the vegetation barrier member 100, which could allow for vegetation growth between the fence post 2100 and the vegetation barrier member 100. A round fence post may also be smaller than a fence post opening 104, which could also lead to an undesirably large gap between the periphery of the fence post and the edge of fence post opening 104.

Figure 20:
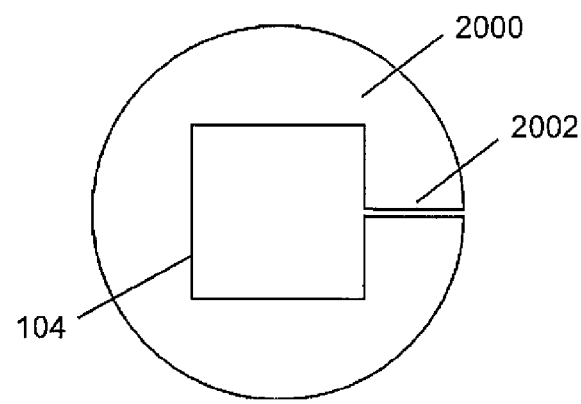
FIG. 20 depicts a top plan view of an embodiment of a filler member.
Figure 22:
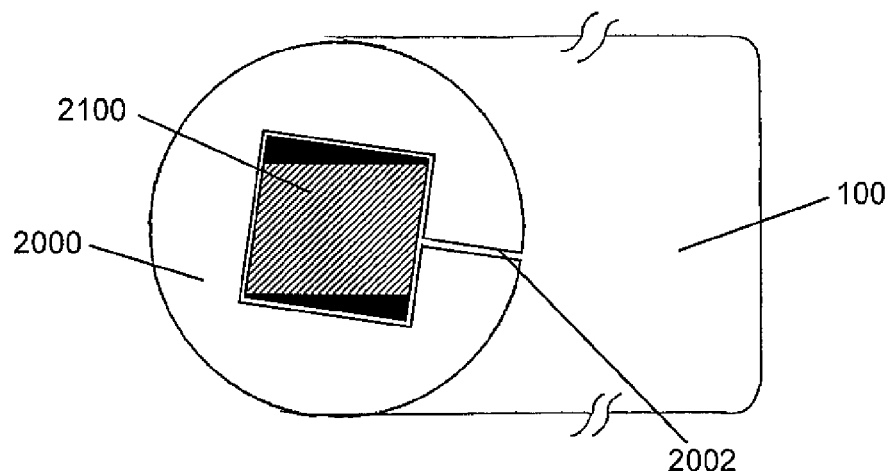
FIG. 22 depicts a top plan view of a filler member positioned overtop a vegetation barrier member, wherein the fence post openings of each of the filler member and the vegetation barrier member are positioned around a fence post.
Figure 23:
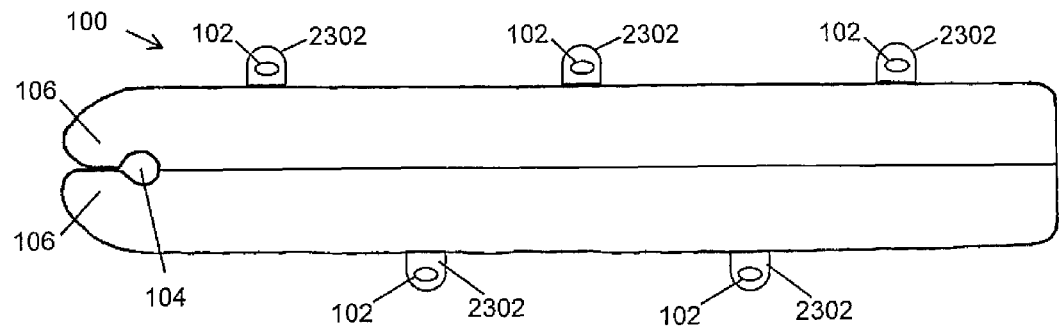
FIG. 23 depicts a top plan view of a fourth embodiment of a vegetation barrier member.
Figure 24:
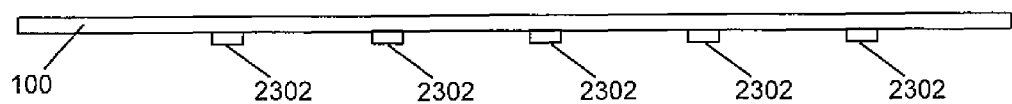
FIG. 24 depicts a side elevation view of the vegetation barrier member of FIG. 23.
Figure 25:
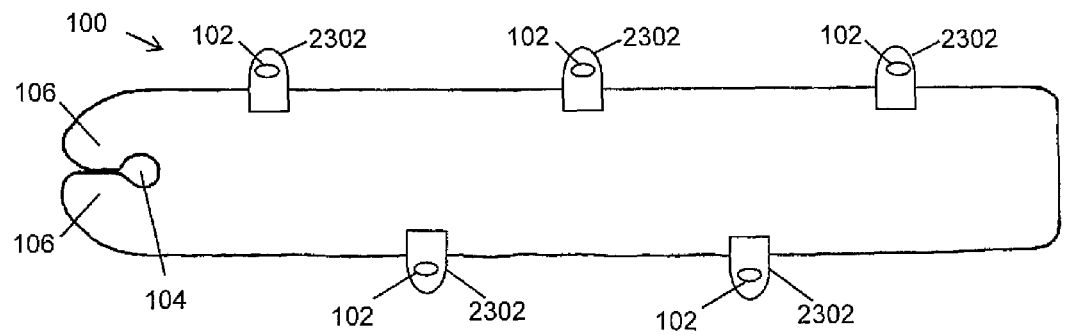
FIG. 25 depicts a bottom plan view of the vegetation barrier member of FIG. 23.

FIG. 20 depicts a filler member 2000 that can be used to address the problem of a gap between a fence post 2100 and a fence post opening 104 that is significantly larger than said fence post. The filler member 2000 comprises a sheet of material comprising a fence post opening 104 that is only slightly larger than fence post 2100. The filler member 2000 further comprises a slot 2002 extending between the perimeter of the filler member 2000 and the fence post opening 104. The edges of slot 2002 may be substantially straight, as shown in FIG. 20, angular, or rounded in a manner similar to the arrangement of fence post engaging arms 106 of vegetation barrier member 100 as depicted in FIG. 12. When there is a substantial gap between the edge of the fence post opening 104 and the periphery of a fence post 2100, for example as depicted in FIG. 21, filler member 2000 may be installed around the fence post 2100 by passing the fence post through slot 2002, resulting in fence post 100 and filler member 2000 both installed around the same fence post, in an overlapping relationship. In FIG. 22, filler member 2000 is depicted installed over the upper face of vegetation barrier member 100. However, filler member 2000 may also be installed underneath vegetation barrier member 100. It may indeed be preferable to install filler member 2000 underneath vegetation barrier member 100, so that filler member 2000 is held in position in the vertical orientation by vegetation barrier member 100. In another embodiment, an overlapping filler member 2000 and vegetation barrier member 100 may be joined together by an intermediate member or through use of a sealant or adhesive.

FIG. 20 depicts a filler member 2000 with a square fence post opening 104. However, fence post opening 104 in filler member 2000 may be shaped to accommodate any shape of fence post. For example, the fence post opening 104 in filler member 2000 may be square, angular, I-shaped, or round. Further, while the filler member 2000 depicted in FIG. 20 is circular and had a diameter that is substantially equal to the width of vegetation barrier member 100, the filler member may be of any shape and size that is sufficient to bridge the gap between the periphery of fence post 2100 and the edge of fence post opening 104.

Even when the gap between a fence post opening 104, either in a vegetation barrier member 100 or in a filler member 2000, and a fence post is small there may still be a desire to eliminate the gap entirely. This can be accomplished through application of a flexible sealant or caulk, such as a silicone caulk, to seal any gaps between the vegetation barrier 900 and the fence posts of the fence under which the vegetation barrier 900 is installed. It is preferred that the sealant used be flexible enough to accommodate expansion and contraction of the vegetation barrier 900. Similarly, a flexible sealant or caulk can be applied to seal any gap between a securement member and an aperture 102.

In one embodiment, the length of the body of the vegetation barrier member 100, as measured longitudinally from the second end of the vegetation barrier member 100 to the proximal edge of the fence post aperture 104, will be approximately half the length of the standard distance between fence posts 1100. For example, chain link fence posts are commonly spaced about 10 feet apart, but it is rare for the spacing to be perfectly uniform. To accommodate this standard spacing, the body of vegetation barrier members 100 would be about 5 feet in length, wherein the body of the vegetation barrier member 100 is defined as the portion of the vegetation barrier member 100 that extends longitudinally from the second end to the proximal edge of fence post opening 104. If the distance between fence posts is somewhat greater than 10 feet, the resulting gap between vegetation barrier members 100 will be covered by the intermediate member 200. This allows for flexibility and ease of installation, since the vegetation barrier 900 accommodates inconsistencies in fence post spacing, without any need for modification to the vegetation barrier 900. In other embodiments, the length of the vegetation barrier member 100 may be selected as desired to suit a distance between fence posts. Further, if a vegetation barrier member 100 is too long for a chosen application, the second end of the vegetation barrier member 100 may be cut to any desired length, as illustrated in FIG. 13.

In a non-illustrated embodiment, two vegetation barrier members 100 and a plurality of intermediate members may be joined to cover a span between two fence posts. In this embodiment, one vegetation barrier member 100 is joined to each of the two fence posts by passing the fence post engaging arms of said vegetation barrier member 100 around the fence post to encompass the fence post within the fence post opening 104. A series of intermediate members 200 would be used to join the pair of fence-post-attached vegetation barrier members 100. An intermediate member 200 may be formed from a vegetation barrier member 100 by cutting the vegetation barrier member to remove the first end comprising the fence post opening, thus forming an intermediate member 200 devoid of any fence post opening 104. Alternately, the intermediate member 200 may be a vegetation barrier member 100 that is produced without a preformed fence post opening 104. The ends of the intermediate member 200 may be rounded, as for the second end of the vegetation barrier member 100, or the ends of the intermediate member 200 may be angular or square. The intermediate members 200 used to span the distance between two fence posts may be cut to size to accommodate the length(s) required to cover the span between the fence-post-attached vegetation barrier members 100. An intermediate member 200 of the configuration shown in FIG. 2 may be used to join one or more intermediate members 200 of the configuration shown in FIG. 34.

Figure 19:
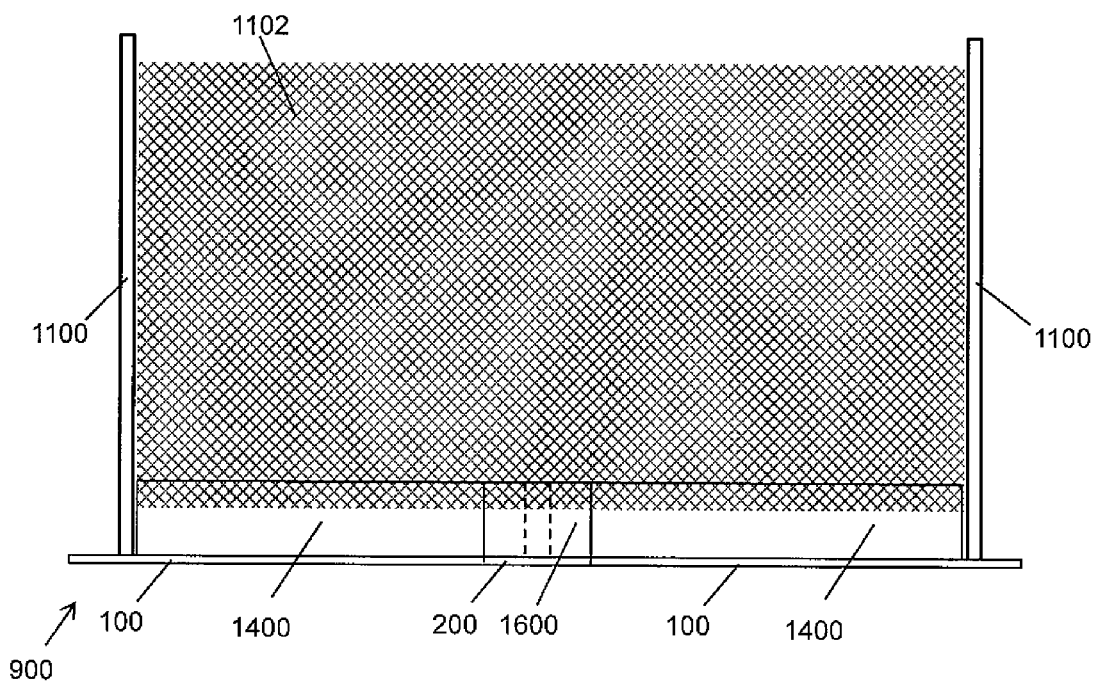
FIG. 19 depicts a side elevation view of the vegetation barrier member of FIG. 14 and the intermediate member of FIG. 16 assembled into a vegetation barrier and joined at each end to a fence post.

A second embodiment of a vegetation barrier 900 is depicted in FIGS. 14 to 19. In this embodiment, the vegetation barrier member 100 and intermediate member 200 each comprise an upward riser 1400 extending substantially perpendicular to the top surface of the vegetation barrier member 100 positioned between the side edges in the lateral direction and extending longitudinally along at least a substantial portion of the length of the vegetation barrier member 100 or intermediate member 200. In an embodiment, the vertical riser is positioned between the side edges in a substantially central position in the lateral direction. The upward riser 1400 is arranged to block a gap between the ground surface and the bottom of a fence, as shown in FIG. 19. It may be desirable to block the gap between the ground surface and the bottom of a fence in order to prevent pets, small animals, or objects from passing underneath the fence. The upward riser 1400 may be integral with vegetation barrier member 100 or intermediate member 200 or it may be joined to vegetation barrier member 100 or intermediate member 200. For example, the upward riser 1400 may be molded into the vegetation barrier member 100 or the intermediate member 200. It is preferred that the upward riser 1400 be made of a weather-resistant and durable material. Suitable materials for the upward riser 1400 include, for example, high density polyethylene, plastic, rubber and composite materials. In an embodiment, the upward riser 1400 may be self-supporting, such that fastening or joining the upward riser 1400 to fence surface 1102 is not required, though is optional. In an embodiment, the upward riser 1400 may be fastened or joined to fence surface 1102 using any suitable fastener as will be understood to a person skilled in the art.

In an embodiment, the upward riser 1400 on vegetation barrier member 100 comprises a preformed slot 1500, extending longitudinally proximal to the second end of the vegetation barrier member; positioned at the base of upward riser 1400, adjacent to the upper surface of the vegetation barrier member 100; and in communication with the outer edge of the second end of the vegetation barrier member 100. In an embodiment, the length of slot 1500 is no longer than the length of the intermediate member 200 in the longitudinal direction. Slot 1500 is arranged to slidingly accommodate intermediate member 200. When an vegetation barrier member 100 comprising an upward riser 1400*a* slidingly engages an intermediate member 200 with an upward riser 1400*b*, a portion of the intermediate member 200 adjacent to the upward riser 1400*b* slides into notch 1500, positioning a portion of upward riser 1400*a* and a portion of upward riser 1400*b* in an overlapping arrangement. The overlap of the two upward risers 1400*a* and 1400*b* ensures continuous coverage of the gap beneath the fence surface 1102 by the upward risers 1400, as shown in FIG. 19. In another embodiment, the upward riser 1400*a* on the vegetation barrier member 100 devoid of notch 1500. In this embodiment, a user may cut the upward riser 1400 as needed to allow intermediate member 200 to slidably engage vegetation barrier member 100. A user may also custom cut a notch 1500 into an upward riser 1400 that does not have a preformed notch 1500.

In addition, a user may cut vertical incisions in the upward riser 1400 extending from the top of upward riser 1400 to the base of upward riser 1400, wherein the base of upward riser 1400 is the portion of upward riser 1400 proximal to the intersection of upward riser 1400 with the upper surface of vegetation barrier member 100. A vertical incision may be introduced at one or more points along the length of vertical riser 1400, in the longitudinal direction, to allow the vegetation barrier member 100 to flex vertically; as may be desired when vegetation barrier member 100 is installed on a surface with an uneven elevation and/or an undulating surface.

Figure 26:
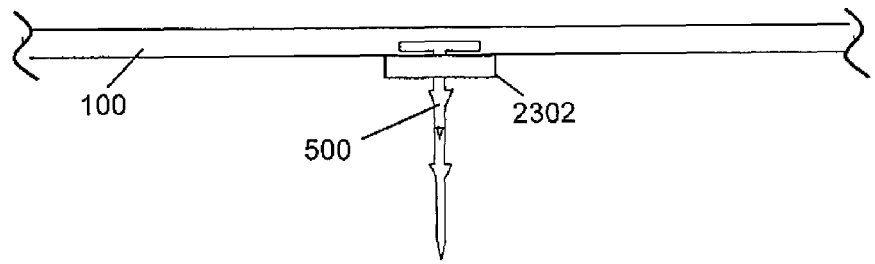
FIG. 26 depicts a side plan view of a portion of the vegetation barrier member of FIG. 23, anchored by a securement pin.

An additional embodiment of a vegetation barrier member 100 is depicted in FIGS. 23 to 26. In this embodiment, the vegetation barrier member 100 comprises one or more securement tabs 2302 that extend laterally outward from one or both of the opposing side edges. Each securement tab comprises an upper face, a lower face, and side edges. Each securement tab 2302 further comprises an aperture 102 arranged to allow the vegetation barrier member 100 to be secured to an underlying surface by a securement member that passes through aperture 102 and into the underlying surface. In an embodiment, the upper face of each securement tab lies below the upper face of the main body of vegetation barrier member 100, for example as depicted in FIG. 26, such that when installed through opening 102 the top of the securement member 500 is able to lie flush with or below the upper face of the vegetation barrier member 100. In an embodiment, aperture 102 is elongated in the longitudinal direction to allow for expansion and contraction of the vegetation barrier 900 in the longitudinal direction without interference from securement member 500. The securement tabs 2302 may be integral with or joined to the vegetation barrier member 100 proximal to the opposing side edges. In an embodiment, the securement tabs 2302 are moulded to vegetation barrier member 100.

Figure 27:
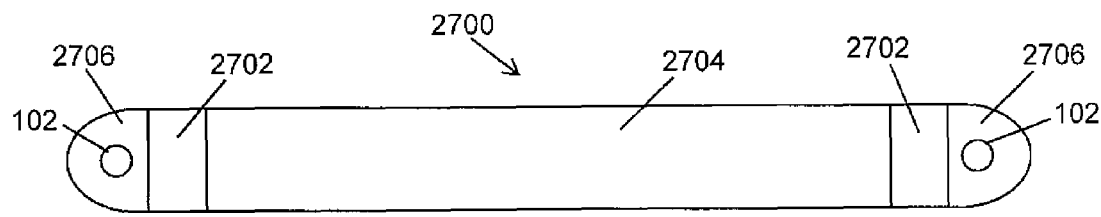
FIG. 27 depicts a top plan view of a securement strip.
Figure 28:
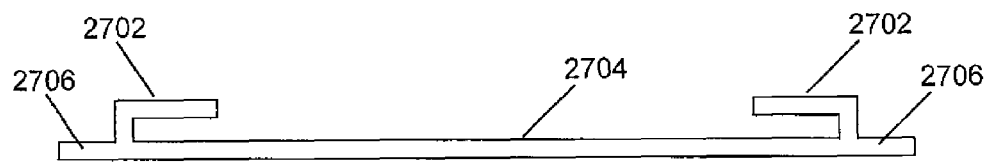
FIG. 28 depicts a side elevation view of the securement strip of FIG. 27.
Figure 29:
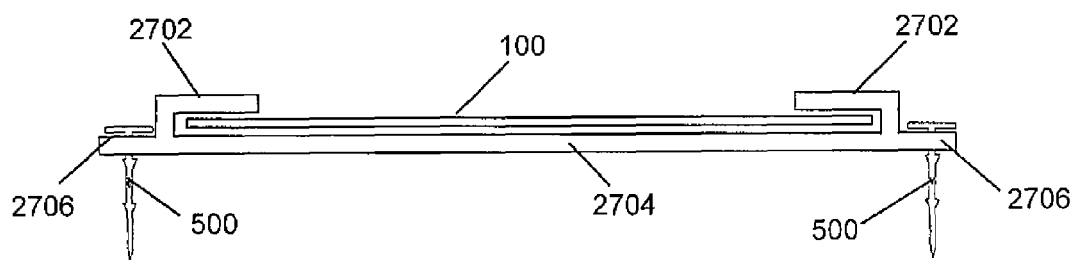
FIG. 29 depicts a side elevation view of the securement strip of FIG. 27 anchored by a securement pin.
Figure 30:
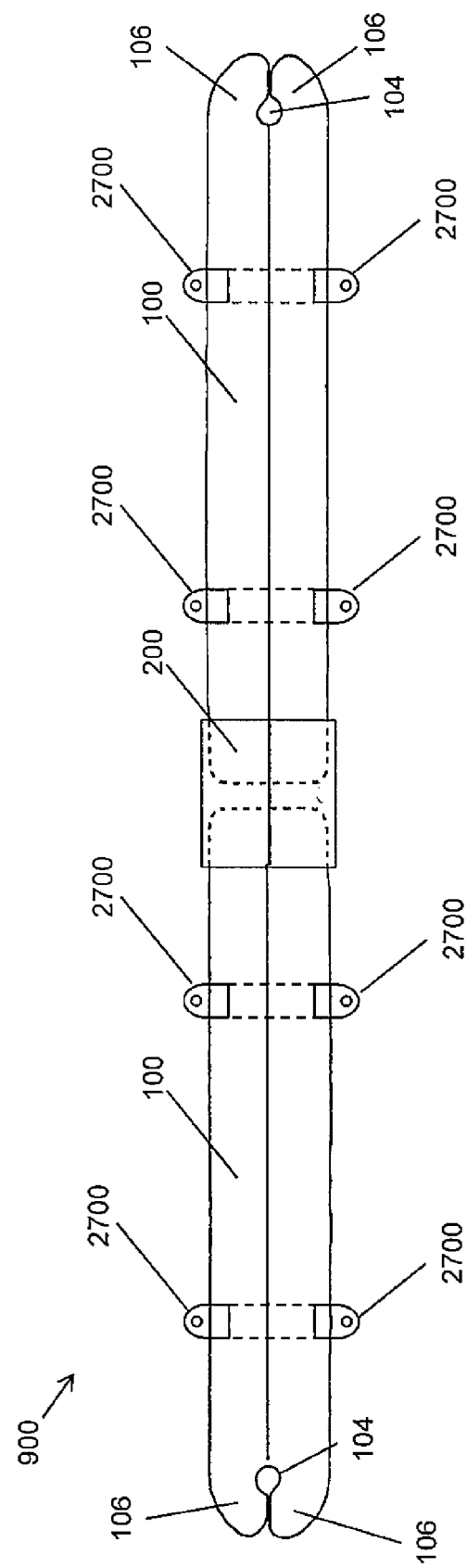
FIG. 30 depicts a top plan view of a vegetation barrier comprising first and second vegetation barrier members joined by an intermediate member, wherein each vegetation barrier member is engaged by two securement strips.

A third embodiment of a vegetation barrier 900 is depicted in FIG. 30. In this embodiment, a vegetation barrier 900 comprising two or more vegetation barrier members 100 and at least one intermediate member 200 is secured to an underlying surface through engagement with at least one securement strip 2700. An embodiment of a securement strip 2700 is detailed in FIGS. 27 to 29. The securement strip 2700 comprises a base 2704 with a length and a width and further having opposite end portions 2706 separated in the longitudinal direction. When engaged with a vegetation barrier member 100 as shown in FIG. 30, the length of the securement strip 2700 is measured in the lateral direction relative to vegetation barrier member 100 and the width of the securement strip 2700 is measured in the longitudinal direction relative to vegetation barrier member 100. The securement strip 2700 further comprises vegetation barrier member retaining members 2702 spaced apart along the length of the securement strip 2700, each retaining member proximal to a respective end portion 2706. The vegetation barrier member retaining members 2702 are arranged to receive an end of a vegetation barrier member 100. The securement strip 2700 is slidingly engageable with a vegetation barrier member 100, as depicted in FIG. 29, such that when a vegetation barrier member 100 is engaged by one or more retaining members 2702, the vegetation barrier member can slide, expand, and contract in the longitudinal direction relative to securement strip 2700. The retaining members 2702 depicted in FIGS. 28 and 29 are of a substantially rectangular profile, however the retaining members 2702 may be rounded, similar to the retaining extensions 300 of intermediate member 200, or of an angular configuration; so long as the shape and size of the retaining members 2702 are sufficient to slidingly retain a vegetation barrier member 100. The end portions 2706 of the securement strip 2700 are arranged to enable the securement strip 2700 to be fastened to an underlying surface. In an embodiment, the end portions 2706 comprise apertures 102 arranged to allow the securement strip 2700 to be secured to an underlying surface by at least one securement pins 500, ground screw, or other suitable fastener that passes through aperture 102 and into an underlying surface. There is no requirement for an aperture 102 in a securement strip 2700 to be elongated, since expansion and contraction of vegetation barrier members 100 is accommodated by the sliding engagement between the vegetation barrier member 100 and the securement strip 2700. Further, the width of securement strip 2700 is shorter than the length of vegetation barrier member 100, leading to only minor expansion and contraction of the securement strip 2700 under freeze-thaw conditions, relative to the longitudinal contraction and expansion expected for the vegetation barrier member 100 under the same freeze-thaw conditions.

FIG. 30 depicts an assembled vegetation barrier 900 engaged by securement strips 2700 that can be secured to an underlying surface, thereby securing the vegetation barrier 900 and inhibiting vertical movement of the vegetation barrier 900 away from the underlying surface. When securement strips 2700 are used to secure the vegetation barrier 900, it is optional for the vegetation barrier member 100 and the intermediate member to comprise apertures 102.

Figure 31:
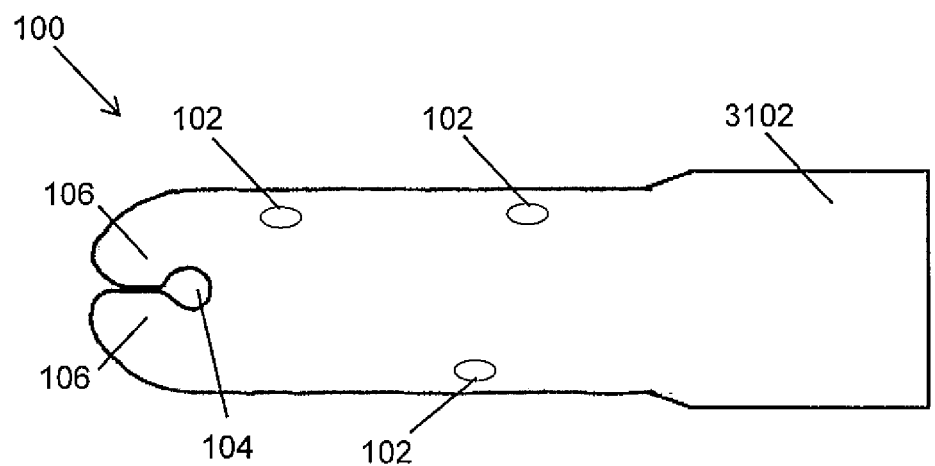
FIG. 31 depicts a top plan view of a vegetation barrier member.
Figure 32:
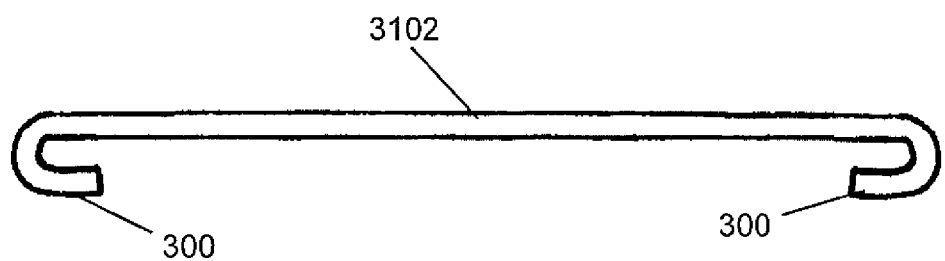
FIG. 32 depicts a right end elevation view of the vegetation barrier member of FIG. 31.
Figure 33:
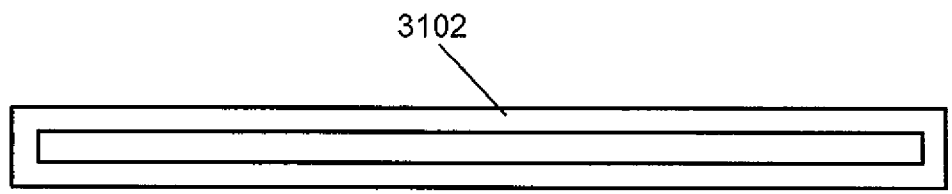
FIG. 33 depicts a right end elevation view of an alternate embodiment of the vegetation barrier member of FIG. 31.
Figure 34:
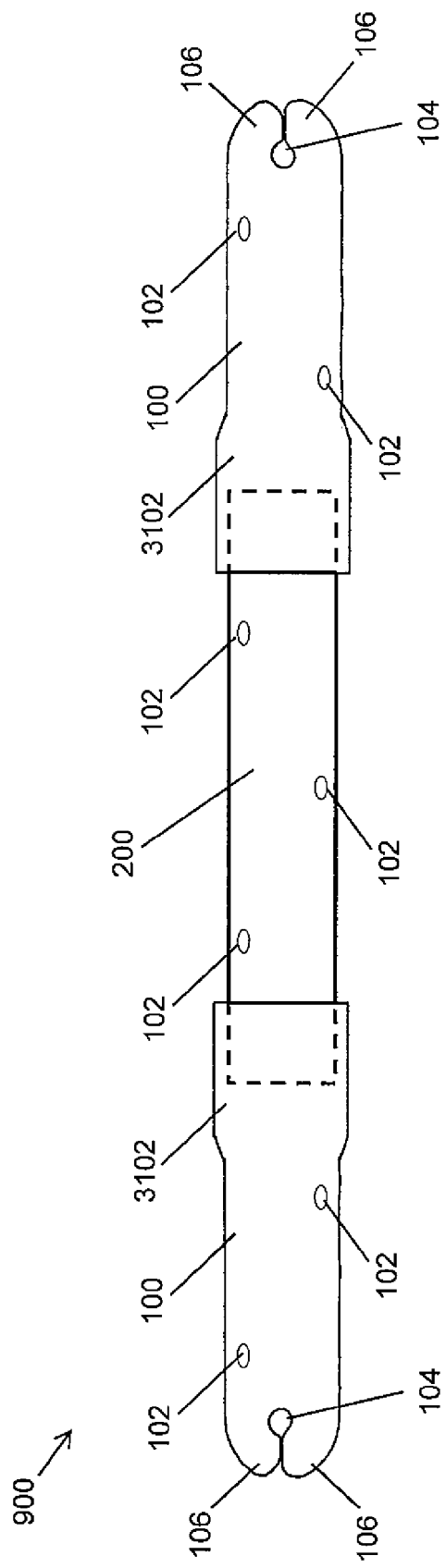
FIG. 34 depicts a top plan view of an embodiment of a vegetation barrier comprising first and second vegetation barrier members and an intermediate member.

A fourth embodiment of a vegetation barrier 900 is depicted in FIG. 34. In this embodiment, the vegetation barrier 900 comprises at least one intermediate member 200 slidingly engaged in the longitudinal direction by a vegetation barrier member 100. Related embodiments of the vegetation barrier member 100 are depicted in FIGS. 31 to 33. In these embodiments, the vegetation barrier member 100 comprises first and second opposite ends and extends in a longitudinal direction between the first and second opposing ends. The vegetation barrier member 100 further comprises opposing side edges that extend in the longitudinal direction. The distance between the opposing side edges in the lateral direction defines the width of vegetation barrier member 100. The vegetation barrier member 100 comprises a first end with a fence post opening 104 and fence post engaging arms 106 and a second end opposite the first end that is devoid of a fence post opening. The second end of the vegetation barrier member 100 comprises a joining portion 3102 that is arranged to slidingly receive in the longitudinal direction an end of an intermediate member 200. In an embodiment, each opposite side of joining portion 3102 has an outer edge comprising a retaining extension 300 that extends beneath the bottom of joining portion 3102 to form a channel that extends along the joining portion 3102 in the longitudinal direction. The channels defined by each retaining extension 300 are arranged to receive an end of an intermediate member 200, as illustrated in FIG. 34, and retain the intermediate member 200 such that movement of the intermediate member 200 relative to the joining portion 3102 is substantially limited to sliding in the longitudinal direction. In another embodiment, the joining portion comprises an upper portion, lower portion, and side portions; wherein the upper and lower portions are spaced apart and the upper, lower, and side portions together form a closed-sided channel arranged to slidingly receive in the longitudinal direction an end of an intermediate member 200*b*.

In the embodiment depicted in FIG. 34, a vegetation barrier member is formed by joining two vegetation barrier members 100, each of which may be joined to a fence post, and one intermediate member 200; wherein each vegetation barrier member 100 is joined to an opposite end of the intermediate member 200 through longitudinal sliding engagement between the joining portion 3102 of the vegetation barrier member 100 and the respective end of the intermediate member 200. The length of the intermediate member 200 may be preselected or cut to size by a user in order to accommodate any particular spacing between adjacent fence posts. Further, if the spacing between adjacent fence posts exceeds the distance spanned by two vegetation barrier members 100 and a single intermediate member 200, one or more additional intermediate members 200 may be added between the two vegetation barrier members 100; the intermediate members 200 being joined to one another in longitudinally sliding engagement.

The length of vegetation barrier member 100 in the longitudinal direction may be selected as desired to accommodate the distance between adjacent fence posts. In an embodiment, the length of vegetation barrier member 100 may be a length selected to accommodate a common fence post spacing and/or to facilitate transport. For example, for posts spaced 10 feet apart, a suitable length for vegetation barrier member 100, measured from the first end to the second end, could be about 4 feet. Paired with an intermediate member 200 that also has a length of about 4 feet, this could allow for ease of transport with all portions of the vegetation barrier being of substantially the same length, and could readily accommodate a 10 foot spacing between fence posts, accommodating a variability in fence post spacing of approximately 6-12 inches. These dimensions are provided solely as illustrative examples, and it is to be understood that the dimensions of the vegetation barrier member 100 and/or intermediate member 200 could readily be varied according to desire.

A further embodiment is a method of producing vegetation barrier members 100 and/or intermediate members 200 using a length of suitable sheet material such as high density polyethylene, plastic, rubber, or composite material; said material having a length in the longitudinal direction, a width in the lateral direction suitably wide for use as a fence vegetation barrier, and opposite side edges in the longitudinal direction. A vegetation barrier member 100 and/or intermediate member 200 is produced by cutting the sheet material to introduce retaining arms, a fence post opening, rounded corners, and/or at least one aperture, wherein the aperture is proximal to a side edge.

In an embodiment of the method, the sheet material is a roll of sheet material that can be unrolled to a desired length before cutting to form a vegetation barrier member 100 and/or intermediate member 200.

In a further embodiment of the method, the fence post opening is cut into the sheet material using a punch that is sized to correspond to a common fence post size and shape, as will be understood by one skilled in the art. For example, common fence post sizes for chain link fences are 2⅜ inch, 2⅞ inch, and 3½ inch, whereas a common fence post size for a wooden board fence post is a nominal 4×4 inches.

It is to be understood that the dimensions of the vegetation barrier member 100 and/or intermediate member 200 may be selected as desired to accommodate any distance between fence posts and to provide as broad a vegetation barrier as may be desired in the lateral direction. Similarly, the length of intermediate member 200 or vegetation barrier member 100 in the longitudinal direction may be selected as desired to allow for flexibility in accommodating fence post spacing. In an embodiment, the intermediate member 200 is significantly shorter in the longitudinal direction than is the vegetation barrier member 100. In an embodiment, the vegetation barrier member, measured in the longitudinal direction from the first end to the second end, is about 6 feet in length and about 12 to 18 inches in width, measured in the lateral direction. These dimensions provide a vegetation barrier that extends roughly 6 to 9 inches from either side of the fence and that readily accommodates a 10 foot spacing between fence posts. In an embodiment, the length of the intermediate member 200 is about 12 to 18 inches, measured in the longitudinal direction. In another embodiment, the vegetation barrier member 100 and intermediate member 200 are similar or substantially identical in length. In an embodiment, the vegetation barrier member 100 and intermediate member 200 are each about 4 feet in length. It is to be understood that these dimensions are merely options and that other dimensions could readily be employed, as desired.

In addition, it is to be understood that the specific elements described herein in respect of any particular embodiment of a vegetation barrier member 100 or intermediate member 200 may be employed with any vegetation barrier member 100 or intermediate member 200 of the disclosure. By way of example, securement tabs 2302 may be included with a vegetation barrier member 100 that either has or does not have a vertical fin 1400; or that has a raised profile (as shown for example in FIG. 3) or a substantially flat profile (as shown for example in FIG. 29). As another example, a vegetation barrier member 100 may be joined to an intermediate member 200 that either has or does not have a vertical fin 1400 or that has a raised profile (as shown for example in FIG. 3) or a substantially flat profile (as shown for example in FIG. 29). Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments.

Further, while the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting. It will be understood by persons skilled in the art that other variants and modifications may be made without departing from the scope of the invention as defined in the appended claims.

In each embodiment described above, a plurality of the vegetation barriers are used in series along a fence. Typically the fence includes a plurality of longitudinally spaced apart fence posts defining a fence section between each adjacent pair of posts. One of the vegetation barriers is associated with each fence section. In this manner, the first and second vegetation barrier members receive respective ones of the two adjacent posts in the fence post openings thereof. Accordingly, each fence post is received in the fence post opening of a first vegetation barrier member of one vegetation barrier of one fence section as well as being received in the fence post opening of the second vegetation barrier member of an adjacent vegetation barrier spanning an adjacent fence section.

Within each fence section, the first and second vegetation barrier members are aligned in a common longitudinal direction of the fenced section to extend inwardly towards one another from the respective fence posts for coupling both of the vegetation barrier members to a common intermediate member centrally located between the pair of fence posts to be spaced inwardly from each of the fence posts at an intermediate location of the fence section.

The slot connecting each fence post opening to the perimeter edge of the body of the vegetation barrier member has a minimal width in a circumferential direction relative to the fence post opening such that the two arcuate arms 106 extending about the fence post opening from the main portion of the body of the vegetation member substantially contact one another at the free ends thereof on opposing sides of the slot. The barrier member thus substantially surrounds any post received in the fence post opening thereof.

In some embodiments, the innermost, second ends of the vegetation barrier members comprise a coupling portion for receiving the respective ends of the intermediate member therein. Alternatively the opposing ends of the intermediate member define the coupling portions receiving the respective ends of the intermediate member therein. In either instance, the intermediate member is coupled to both of the vegetation barrier members by a coupling portion formed of two retaining members extending downwardly and inwardly from the opposing side edges of the respective member to define a channel that receives the opposing side edges of the member being coupled thereto for relative sliding movement in the longitudinal direction of the fence section.

In each instance, each intermediate member or vegetation barrier member comprises a single unitary body having an upper surface and a lower surface which are joined with one another about a perimeter edge of the body. The perimeter edge includes two laterally opposed side edges extending in the longitudinal direction between opposing ends. The opposing ends of the intermediate member comprise a blunt or rounded end which is free and devoid of any recesses or fence post openings therein similarly to the inner second ends of the vegetation barrier members.

At the first ends of the vegetation barrier members, the perimeter edge is generally semi-circular in shape so as to be concentric with the circular fence post opening approximate the first end of the barrier member. The radius of curvature of the semi-circular perimeter edge is equal to half a width of the barrier member in the lateral direction between the two opposing side edges. Accordingly, even when the vegetation barriers of two non-parallel adjacent fence sections are coupled to a common post between the adjacent fence sections, the resulting barrier assembly forms a pair of substantially continuous opposing side edges along both sides of the fence assembly.

Each of the vegetation barrier members and the intermediate member are elongate in the longitudinal direction so as to be many times longer in the longitudinal direction than the width in the lateral direction. Typically, the vegetation barrier members are sized to span approximately half the length of the respective fence section such that the two vegetation barrier members meet centrally along the respective fence section where they are coupled commonly to the respective intermediate member. Alternatively, the intermediate member may span most of the length of the fence section, however the coupling portions are typically provided on the barrier members in this instance. Among the illustrated embodiments, the members which are received within coupling portions of adjacent members are typically the ones which are the longer ones of the members.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A vegetation barrier system for deterring the growth of vegetation beneath a fence having a plurality of spaced apart posts and a fencing material extending between said posts, said vegetation barrier system including a plurality of vegetation barriers which are identical in configuration to one another, each vegetation barrier being adapted to span between a respective adjacent pair of the posts and comprising:

first and second vegetation barrier members, each of said vegetation barrier members comprising a unitary body which is elongate in a longitudinal direction and which further comprises:
 a length extending longitudinally between opposite first and second ends and having opposite side edges extending in the longitudinal direction;
 a width between said opposite side edges in the lateral direction;
 an upper surface;
 a lower surface;
 a fence post opening extending through the body between the upper surface and the lower surface proximal to said first end such that the body of the vegetation barrier member substantially fully surrounds the respective fence post opening;
 a perimeter edge at the first end of each vegetation barrier member that is semi-circular in shape about the respective fence post opening in which a radius of curvature of the perimeter edge at the first end of each vegetation barrier member is equal to half of the width of the vegetation barrier member between the opposite side edges so as to be continuous with both of the opposite side edges; and
 a slot extending from the fence post opening to said semi-circular perimeter edge at a laterally central location; and an intermediate member comprising a unitary body which further comprises:
 a length extending in a respective longitudinal direction between opposite ends and having opposite side edges extending in the longitudinal direction;
 a width between said opposite side edges in the lateral direction;
 an upper surface;
 a lower surface;

wherein the opposite ends of the intermediate member are arranged to be coupled to respective ones of the second ends of the first and second vegetation barrier members so as to be slidable relative to one another in the longitudinal direction of the intermediate member; and wherein the first end of each vegetation barrier member is adapted to be overlapped by the first end of the vegetation barrier member of an adjacent one of the vegetation barriers about a common one of the fence posts such that a common rounded edge is formed along one side of the fence between the side edges of the vegetation barriers by the perimeter edges of the vegetation barrier members irrespective of a relative angle between the two adjacent vegetation barriers about an upright axis of said common one of the fence posts.

2. The vegetation barrier system of claim 1, wherein the first and second vegetation barrier members of each vegetation barrier are identical to one another.

3. The vegetation barrier system of claim 1, wherein one of the second ends of the vegetation barrier members and the opposite ends of the intermediate member of each vegetation barrier comprise respective coupling portions in which each coupling portion includes a pair of retainer portions formed along the opposite side edges which define a channel, the channels being arranged to slidably receive another one of said second ends of the vegetation barrier members and said opposite ends of the intermediate member respectively therein.

4. The vegetation barrier system of claim 3, wherein the coupling portions are provided on the second ends of the vegetation barrier members respectively.

5. The vegetation barrier system of claim 3, wherein the coupling portions are provided on the opposite ends of the intermediate member respectively.

6. The vegetation barrier system of claim 1, wherein the first and second vegetation barrier members of each vegetation barrier are longer than the intermediate member of that vegetation barrier.

7. The vegetation barrier system of claim 1, wherein the second end of each of the first and second vegetation barrier members is devoid of any fence post opening.

8. The vegetation barrier system of claim 1, wherein at least one of the first vegetation barrier member, the second vegetation barrier member, and the intermediate member of each vegetation barrier comprises at least one fastener aperture formed within said member; said at least one fastener aperture being arranged to receive a ground penetrating fastener therethrough to allow said member to be secured to the ground.

9. The vegetation barrier system of claim 8, wherein the vegetation barrier members each include said at least one fastener aperture formed therein.

10. The vegetation barrier system of claim 8, wherein the intermediate member of each vegetation barrier includes said at least one fastener aperture formed therein.

11. The vegetation barrier system of claim 8, wherein at least one of the first vegetation barrier member, the second vegetation barrier member, and the intermediate member of each vegetation barrier comprises a plurality of securement tabs protruding laterally outward from at least one of the side edges of said member; each securement tab locating one of the fastener apertures therein.

12. The vegetation barrier system of claim 8, wherein said at least one fastener aperture is elongate in the longitudinal direction.

13. The vegetation barrier system of claim 1, wherein the upper surface of the body of each one of the first vegetation barrier member, the second vegetation barrier member, and the intermediate member of each vegetation barrier comprises a pair of planar surfaces extending downwardly and laterally outwardly from an apex towards respective ones of the opposite side edges along substantially a full length of the member.

14. The vegetation barrier system of claim 1, further comprising a securement strip arranged to secure a respective one of the members of each vegetation barrier to the ground, the securement strip comprising:
 a base extending laterally between opposite first and second ends thereof;
 a pair of retaining elements projecting upwardly from the base at laterally spaced positions so as to define a central portion of the base between the retaining elements which receives the width of the respective member of the vegetation barrier therebetween, and a pair of end portions of the base protruding laterally outwardly from opposing sides of the central portion towards respective ones of the first and second ends;
 the end portions each locating a fastener aperture therein which is arranged to receive a ground penetrating fastener therethrough to allow said member to be secured to the ground.

15. The vegetation barrier of claim 1, wherein at least one of the first vegetation barrier member, second vegetation barrier member, and intermediate member of each vegetation barrier comprises an upward riser positioned laterally between the opposing side edges of said member and extending substantially vertically upward from the upper surface of said member, said riser extending longitudinally along at least a substantial portion of the length of said member.

16. The vegetation barrier of claim 15, wherein each one of the first vegetation barrier member, second vegetation barrier member, and intermediate member of each vegetation barrier comprises the upward riser, and wherein the upward riser includes a preformed slot extending longitudinally proximal to and in communication with an end of said member, said preformed slot being positioned at the base of the upward riser adjacent to the upper surface of said member.

17. The vegetation barrier of claim 1, further comprising a filler member for covering a gap between each fence post opening and a corresponding fence post, each filler member comprising:
 a planar body having a circular perimeter edge, an upper surface, a lower surface;
 a fence post opening extending through the body between the upper surface and the lower surface; and
 a slot extending from the fence post opening to the perimeter edge of the body.

\* \* \* \* \*